United States Patent
Sugawara et al.

(10) Patent No.: US 12,227,165 B2
(45) Date of Patent: Feb. 18, 2025

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventors: Hiroki Sugawara, Hitachinaka (JP); Kentaro Ueno, Hitachinaka (JP); Daisuke Noma, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 200 days.

(21) Appl. No.: 18/016,990

(22) PCT Filed: Jul. 20, 2021

(86) PCT No.: PCT/JP2021/027141
§ 371 (c)(1),
(2) Date: Jan. 19, 2023

(87) PCT Pub. No.: WO2022/024873
PCT Pub. Date: Feb. 3, 2022

(65) Prior Publication Data
US 2023/0347861 A1 Nov. 2, 2023

(30) Foreign Application Priority Data
Jul. 28, 2020 (JP) .................. 2020-127258

(51) Int. Cl.
*B60W 10/20* (2006.01)
*B60W 30/10* (2006.01)
(Continued)

(52) U.S. Cl.
CPC .......... *B60W 10/20* (2013.01); *B60W 30/10* (2013.01); *B60W 40/105* (2013.01);
(Continued)

(58) Field of Classification Search
CPC .... B60W 10/20; B60W 60/001; B60W 30/10; B60W 40/105; B60W 2540/18; B60W 2710/207
See application file for complete search history.

(56) References Cited

U.S. PATENT DOCUMENTS

2001/0002769 A1* 6/2001 Matsuno ............... B60T 8/1755
303/146
2006/0041364 A1* 2/2006 Tsukasaki ............. B62D 6/003
701/69
(Continued)

FOREIGN PATENT DOCUMENTS

JP 2018-58483 A 4/2018

OTHER PUBLICATIONS

International Search Report (PCT/ISA/210) issued in PCT Application No. PCT/JP2021/027141 dated Oct. 5, 2021 with English translation (five (5) pages).
(Continued)

*Primary Examiner* — George C Jin
(74) *Attorney, Agent, or Firm* — Crowell & Moring LLP

(57) ABSTRACT

A vehicle control device, a vehicle control method, and a vehicle control system according to the present invention perform feedback control to reduce difference in lateral direction or difference in turning direction between an own vehicle and a travel target, so as to acquire a first steering angle control command for increasing a steering angle control amount as the velocity of the own vehicle decreases, acquire a second steering angle control command for decreasing the steering angle control amount with respect to the velocity, compared with a magnitude of the steering angle control amount with respect to the velocity obtained by the first steering angle control command, output the first steering angle control command when the velocity is greater than a predetermined threshold, and output the second
(Continued)

steering angle control command when the velocity is equal to, or less than, the predetermined threshold.

15 Claims, 14 Drawing Sheets

(51) Int. Cl.
  *B60W 40/105* (2012.01)
  *B60W 60/00* (2020.01)
(52) U.S. Cl.
  CPC ....... *B60W 60/001* (2020.02); *B60W 2540/18* (2013.01); *B60W 2710/207* (2013.01)

(56) References Cited

U.S. PATENT DOCUMENTS

| | | | |
|---|---|---|---|
| 2006/0095188 A1* | 5/2006 | Post, II | B60W 40/11 180/408 |
| 2008/0021612 A1 | 1/2008 | Sakuma | |
| 2017/0313304 A1* | 11/2017 | Shiraishi | B60W 30/04 |
| 2018/0093709 A1 | 4/2018 | Oguro | |
| 2018/0170377 A1* | 6/2018 | Tatsukawa | B60W 30/12 |
| 2018/0208184 A1* | 7/2018 | Sugai | B60L 15/2009 |
| 2023/0347861 A1* | 11/2023 | Sugawara | B60W 40/105 |

OTHER PUBLICATIONS

International Preliminary Report on Patentability (PCT/IB/326, PCT/IB/338 & PCT/IB/373) issued in PCT Application No. PCT/JP2021/027141 dated Feb. 9, 2023, including Japanese-language Written Opinion (PCT/ISA/237) with English translation (nine (9) pages).

Extended European Search Report issued in European Application No. 21850656.6 dated Dec. 21, 2023 (9 pages).

\* cited by examiner

VEHICLE CONTROL DEVICE, VEHICLE CONTROL METHOD, AND VEHICLE CONTROL SYSTEM

TECHNICAL FIELD

The present invention relates to a vehicle control device, to a vehicle control method, and to a vehicle control system.

BACKGROUND ART

A vehicle control device in Patent Document 1 includes: a target steering angle generation unit that generates the target steering angle of a vehicle from the relationship between lane information and the orientation of the vehicle in a low velocity traveling state in which a velocity Vs of the vehicle is equal to, or less than, a predetermined value; and a steering angle control unit that performs steering angle control for adjusting the steering angle of the vehicle to the target steering angle.

REFERENCE DOCUMENT LIST

Patent Document

Patent Document 1: JP2018-58483 A

SUMMARY OF THE INVENTION

Problem to be Solved by the Invention

When a vehicle runs in an automated (or autonomous) driving mode, steering angle control is performed. In this steering angle control, a lateral acceleration command for causing the vehicle to follow a travel target is converted into a steering angle command. In this case, the steering angle command increases as the velocity of the vehicle decreases.

Thus, if the velocity of the vehicle is low and if the deviation from the travel target is large, the steering angle command increases, and overshoot consequently occurs in the steering angle control. Thus, because the steering angle fluctuates, there is a possibility that the vehicle will weave or meander.

The present invention has been made in view of these circumstances, and an object of the present invention is to provide a vehicle control device, a vehicle control method, and a vehicle control system that can prevent weaving or meandering of a vehicle caused by variability of its steering angle when the vehicle runs at a low velocity.

Means for Solving the Problem

One aspect of the present invention includes: acquiring a physical amount relating to a difference in lateral direction or that in turning direction between an own vehicle and a travel target of the own vehicle; acquiring a physical amount relating to a velocity of the own vehicle; performing feedback control to reduce the physical amount relating to the difference in lateral direction or the difference in turning direction, so as to acquire a first steering angle control command for increasing a steering angle control amount as the velocity decreases; acquiring a second steering angle control command for decreasing the steering angle control amount with respect to the velocity, compared with a magnitude of the steering angle control amount with respect to the velocity obtained by the first steering angle control command; outputting the first steering angle control command when the physical amount relating to the velocity is greater than a predetermined threshold; and outputting the second steering angle control command when the physical amount relating to the velocity is equal to, or less than, the predetermined threshold.

Effects of the Invention

The present invention prevents weaving or meandering of a vehicle caused by variability of its steering angle when the vehicle runs at a low velocity.

MODE FOR CARRYING OUT THE INVENTION

Hereinafter, examples of a vehicle control device, a vehicle control method, and a vehicle control system according to the present invention will be described with reference to drawings.

Figure 1:
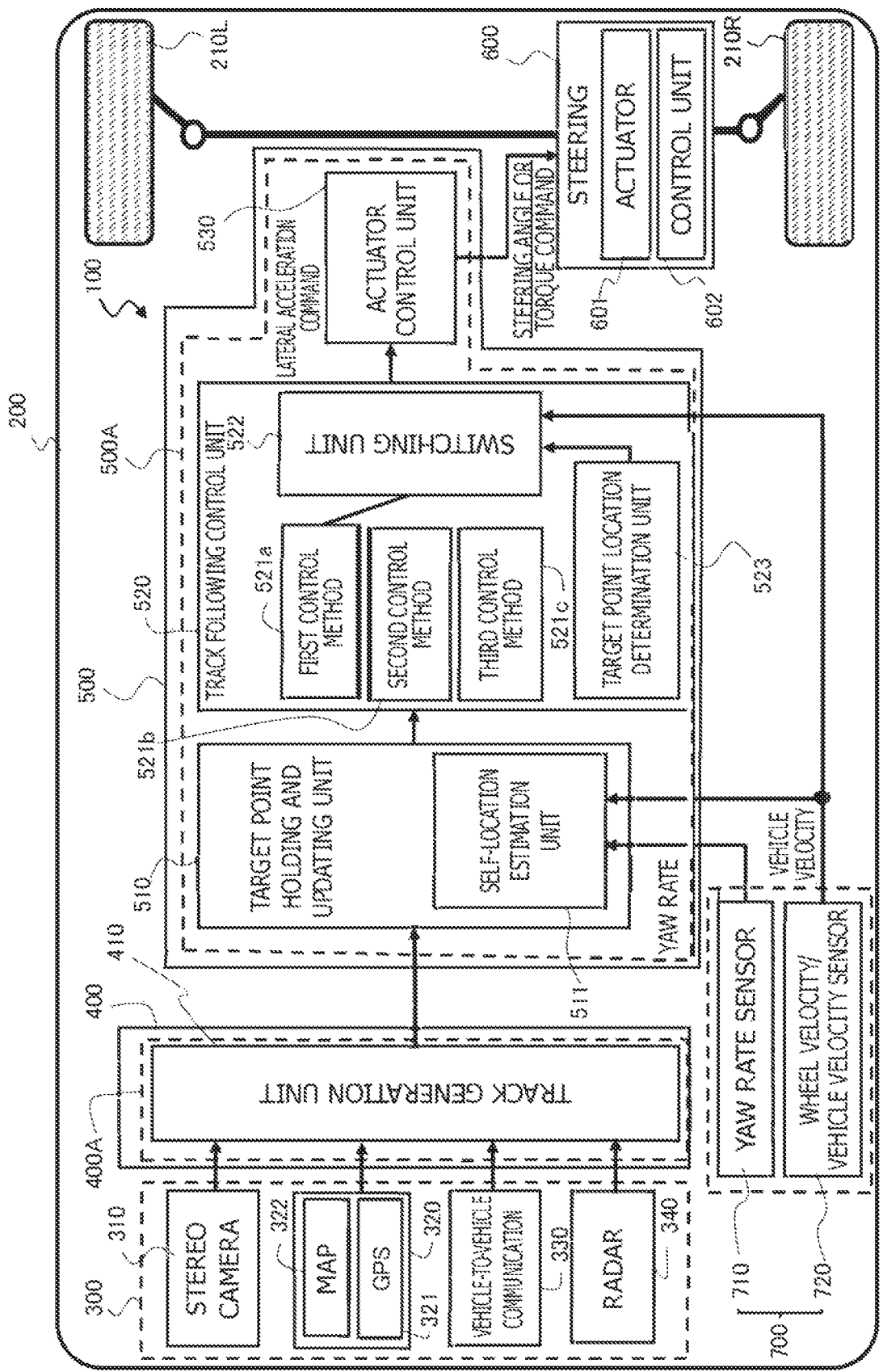
FIG. 1 is a block diagram of a vehicle control system.

FIG. 1 is a block diagram illustrating a mode of a vehicle control system 100.

Vehicle control system 100 is a system of a vehicle 200 such as a four-wheeled vehicle and controls the steering angle of vehicle 200 such that vehicle 200 (in other words, "own vehicle") runs along a target track as its travel target.

Vehicle control system 100 includes an external information recognition unit 300, an automated (autonomous) driving control device 400, a vehicle control device 500, an electronically controlled power steering device 600, and a vehicle motion detection unit 700.

Automated driving control device 400 and vehicle control device 500 are electronic control devices including microcomputers 400A and 500A, respectively, as their respective main components, which perform calculation based on their respective input information and output their respective calculation results.

Microcomputers 400A and 500A each include a microprocessor unit (MPU), a read-only memory (ROM), a random access memory (RAM), etc.

Automated driving control device 400 (specifically, the microcomputer 400A) calculates and outputs the target track of vehicle 200, in other words, the travel target of its own vehicle, based on external information acquired from external information recognition unit 300.

Vehicle control device 500 (specifically, the microcomputer 500A) acquires information about the target track from automated driving control device 400 and acquires information about the motion state of vehicle 200 from vehicle motion detection unit 700.

Next, based on the acquired information, vehicle control device 500 calculates a steering angle control command for causing vehicle 200 to follow the target track and outputs the calculated steering angle control command to electronically controlled power steering device 600.

That is, vehicle control device 500 has a function as a control unit that outputs a result obtained by calculation based on input information to electronically controlled power steering device 600 as a steering angle control command.

Electronically controlled power steering device 600 changes the traveling direction of vehicle 200 by changing the angle of front wheels 210L and 210R of vehicle 200.

Electronically controlled power steering device 600 includes a steering actuator 601 such as a motor that changes the angle of front wheels 210L and 210R and a steering control unit 602 that controls steering actuator 601.

Steering control unit 602 controls steering actuator 601 based on the steering angle control command acquired from vehicle control device 500, so as to realize a steering angle or a steering torque based on the steering angle control command.

External information recognition unit 300 includes a stereo camera 310, a navigation system 320, a vehicle-to-vehicle communication device 330, and a radar 340.

Stereo camera 310 detects and distinguishes objects around vehicle 200 (in other words, its own vehicle) and calculates, for example, the distance to the individual object.

Navigation system 320 includes a global positioning system (GPS) reception unit 321 and a map database 322, and acquires, for example, information about the current location of vehicle 200 and information about a path to a destination.

GPS reception unit 321 receives signals from GPS satellites and measures the longitude and latitude of the location of vehicle 200.

Map database 322 is configured in a storage device mounted in vehicle 200, and its map information includes information about road locations, road shapes, intersection locations, etc.

Vehicle-to-vehicle communication device 330 performs vehicle-to-vehicle wireless communication, so as to acquire, for example, road traffic information and information about behaviors of other vehicles from other vehicles.

Radar 340 detects an obstacle in front of vehicle 200, measures the distance to and the velocity of this obstacle, and outputs information about this obstacle.

External information recognition unit 300 may include a LiDAR (Light Detection and Ranging, Laser Imaging Detection and Ranging), which is a sensor using laser light, and a road-to-vehicle communication device, for example.

The road-to-vehicle communication device transmits information about vehicle 200 to roadside devices and receives road traffic information such as about curves and intersections from the roadside devices.

Vehicle motion detection unit 700 includes a yaw rate sensor 710 and a wheel velocity/vehicle velocity sensor 720, for example.

Yaw rate sensor 710 detects a physical amount relating to the yaw rate of vehicle 200.

Wheel velocity/vehicle velocity sensor 720 detects a physical amount relating to the rotation velocity of each wheel of vehicle 200 and/or a physical amount relating to the velocity of vehicle 200 and outputs a signal indicating velocity V of vehicle 200.

Vehicle motion detection unit 700 may include a sensor for detecting a physical amount relating to any one of, for example, the longitudinal acceleration, the lateral acceleration, and the vertical acceleration of vehicle 200.

Automated driving control device 400 has a function as a track generation unit 410 as software.

Track generation unit 410 recognizes the situation around its own vehicle based on information acquired from external information recognition unit 300, that is, information about the location of its own vehicle and information about objects around its own vehicle, and generates a target track (in other words, a travel target), which is the traveling path target of vehicle 200 based on the recognition result.

In this operation, track generation unit 410 sets target points, on which the vehicle 200 is to pass, from the recognition result of the situation in front of vehicle 200 and outputs information about the target points as information about the target track.

Vehicle control device 500 has functions as a target point holding and updating unit 510, a track following control unit 520, and an actuator control unit 530 as software.

Target point holding and updating unit 510 acquires the information about the target points from track generation unit 410 in automated driving control device 400 and acquires the information about the motion of the vehicle from vehicle motion detection unit 700, specifically, the information about the physical amounts relating to the yaw rate and the velocity of vehicle 200.

In addition, target point holding and updating unit 510 includes a self-location estimation unit 511 that estimates the location of vehicle 200 by performing so-called dead reckoning based on the information relating to the vehicle motion such as the information about the velocity and the yaw rate.

By acquiring the target point information from track generation unit 410 at predetermined time intervals and accumulating the information, target point holding and updating unit 510 recognizes a target track formed by a plurality of target points acquired chronologically.

In this operation, target point holding and updating unit 510 stores the target points as two-dimensional coordinate points in a vehicle coordinate system, which is used as a reference coordinate system when the target points are acquired.

When target point holding and updating unit 510 acquires the target point information, the current location of vehicle 200 is set as the origin in the reference coordinate system. In addition, the lengthwise direction of vehicle 200 is set as the x axis, and the width direction of vehicle 200 is set as the y axis.

Track following control unit 520 calculates a vehicle behavior command such as a lateral acceleration command for causing vehicle 200 to follow the target track, based on the target track information acquired from target point holding and updating unit 510.

Next, track following control unit 520 outputs a signal indicating the calculated vehicle behavior command to actuator control unit 530.

Actuator control unit 530 converts the vehicle behavior command acquired from track following control unit 520 into a steering angle control command, which is a steering angle or steering torque command, and outputs the steering angle control command to electronically controlled power steering device 600.

Steering control unit 602 in electronically controlled power steering device 600 acquires the steering angle control command from actuator control unit 530 and controls steering actuator 601 based on the acquired steering angle control command.

Track following control unit 520 includes a plurality of control methods 521a, 521b, 521c, etc., as control methods (in other words, means of control) used by vehicle control device 500 to acquire the steering angle control command for causing vehicle 200 follow the target track.

In addition, track following control unit 520 includes a control switching unit 522 for selecting one of control methods 521a, 521b, 521c, etc.

Control switching unit 522 acquires information indicating a determination result about the target point location from a target point location determination unit 523 and acquires the information about the physical amount relating to velocity V of vehicle 200 from wheel velocity/vehicle velocity sensor 720.

Next, based on the acquired information, control switching unit 522 selects one of the control methods used for determining the steering angle control command, in other words, one of the steering angle control commands defined by their respective control methods.

Control methods 521a, 521b, 521c, etc., include at least a first control method and a second control method for acquiring steering angle control commands representing different steering angle control amounts with respect to velocity V.

The first control method is feedback control for reducing the physical amount relating to the difference in lateral direction or the difference in turning direction between vehicle 200 and a travel target of vehicle 200 and acquires a first steering angle control command for increasing the steering angle control amount as velocity V of vehicle 200 decreases.

The second control method acquires a second steering angle control command for decreasing the steering angle control amount with respect to velocity V, compared with the magnitude of the steering angle control amount with respect to velocity V obtained by the above first steering angle control command.

If the physical amount relating to velocity V is greater than a predetermined threshold, control switching unit 522 selects the first control method. If the physical amount relating to velocity V is equal to, or less than, the predetermined threshold, control switching unit 522 selects the second control method.

In other words, if velocity V is greater than a predetermined threshold Vth (V>Vth), control switching unit 522 outputs the first steering angle control command. If velocity V is equal to, or less than, predetermined threshold Vth (V≤Vth), control switching unit 522 outputs the second steering angle control command.

For example, if predetermined threshold Vth is about 20 km/h and if velocity V is greater than predetermined threshold Vth (V>Vth), vehicle 200 is determined to be in an intermediate or high velocity traveling state.

If velocity V is equal to, or less than, predetermined threshold Vth (V≤Vth), vehicle 200 is determined to be in a low velocity traveling state. The low velocity traveling state includes when vehicle 200 is started and velocity V increases from zero and when velocity V decreases to zero and vehicle 200 is stopped.

Hereinafter, the plurality of control methods 521a, 521b, 521c, etc., in track following control unit 520 and a modes of how control switching unit 522 selects one of the control methods (in other words, one of the steering angle control commands) will be described in detail.

First Example

Track following control unit 520 includes, as a first control method, a control method for converting a lateral acceleration command (in other words, a horizontal velocity command) for causing vehicle 200 to follow a target track into a steering angle control command and includes, as a second control method, a control method for acquiring a steering angle for turning wheels toward a target point as a steering angle control command.

Hereinafter, the control method for converting a lateral acceleration command for causing vehicle 200 to follow a target track into a steering angle control command will be described in detail.

Track following control unit 520 acquires, for example, information about a lateral deviation Yerr and an angular deviation θerr that represent amounts of deviation of vehicle 200 from a target track at a preview point and information about the curvature of the target track at the preview point. Next, based on the acquired information, track following control unit 520 calculates a lateral acceleration command Ygcmd that reduces deviations Yerr and θerr.

Next, actuator control unit 530 converts lateral acceleration command Ygcmd acquired from track following control unit 520 into a steering angle command θcmd as the steering angle control command and transmits a signal indicating steering angle command θcmd to steering control unit 602 in electronically controlled power steering device 600.

The preview point is, for example, a location in front of vehicle 200, the location being away from vehicle 200 by preview distance Lp (Lp=Tp·V) based on velocity V of vehicle 200 and preview time Tp.

Actuator control unit 530 converts lateral acceleration command Ygcmd into steering angle command θcmd in accordance with Equation 1.

In Equation 1, Ast represents a stability factor, Lwb represents a wheel base, and Goa represents an overall gear ratio, which is a ratio between the steering angle and the actual steering angle.

$$\theta cmd = \frac{(1 + Ast \cdot V^2) Lwb \cdot Goa}{V^2} \times Ygcmd \qquad \text{[Equation 1]}$$

That is, steering angle command θcmd increases as the amount of deviation of vehicle 200 from the target track increases and lateral acceleration command Ygcmd increases.

In addition, in the processing for converting lateral acceleration command Ygcmd into steering angle command θcmd, steering angle command θcmd is in inverse proportion to the square of velocity V. That is, lower velocity V results in greater steering angle command θcmd.

As described above, the control method for converting a lateral acceleration command for causing vehicle 200 to follow a target track into a steering angle control command is feedback control for decreasing the physical amount relating to lateral deviation Yerr, which is the difference in lateral direction between vehicle 200 and the target track or for decreasing the physical amount relating to angular deviation θerr, which is the difference in turning direction between vehicle 200 and the target track. The control method acquires steering angle command θcmd (in other words, the first steering angle control command) for increasing the steering angle control amount as velocity V decreases.

Next, the control method for acquiring, as the steering angle control command, a steering angle at which the wheels are turned toward the target point will be described in detail.

When track following control unit 520 performs the control method for acquiring, as the steering angle control command, a steering angle at which the wheels are turned toward the target point, track following control unit 520 selects a different target point, depending on whether vehicle 200 is caused to follow a preceding vehicle or vehicle 200 is caused to nm alone.

Figure 2:
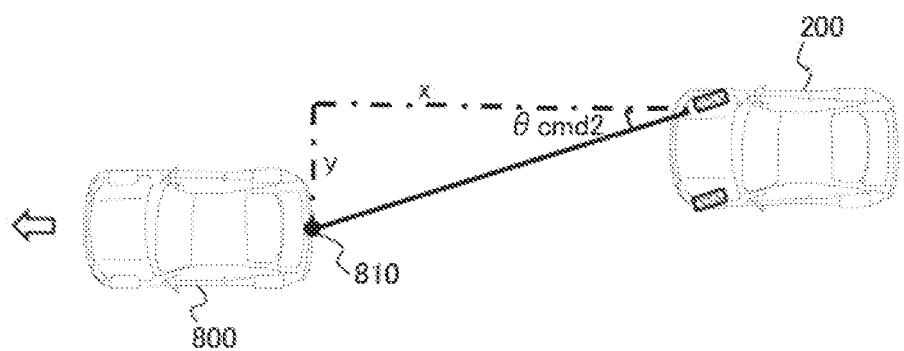
FIG. 2 illustrates a control method for turning wheels toward a preceding vehicle.

FIG. 2 illustrates a target point selected when vehicle 200 is caused to follow a preceding vehicle 800.

In this case, track following control unit 520 selects, as a following control target point (in other words, a travel target), a rear edge center part 810 of preceding vehicle 800 running in front of its own vehicle.

Next, track following control unit 520 acquires steering angle command θcmd2, so as to obtain a steering angle control command for turning the wheels of its own vehicle toward rear edge center part 810 of preceding vehicle 800.

More specifically, assuming that the distance from vehicle 200 to preceding vehicle 800 in front of vehicle 200 is x and the lateral shift amount of vehicle 200 from preceding vehicle 800 is y, track following control unit 520 calculates steering angle command θcmd2 for turning front wheels 210L and 210R toward rear edge center part 810 of preceding vehicle 800 in accordance with Equation 2.

$$\theta cmd = \tan^{-1}\left(\frac{y}{x}\right) \quad \text{[Equation 2]}$$

Figure 3:
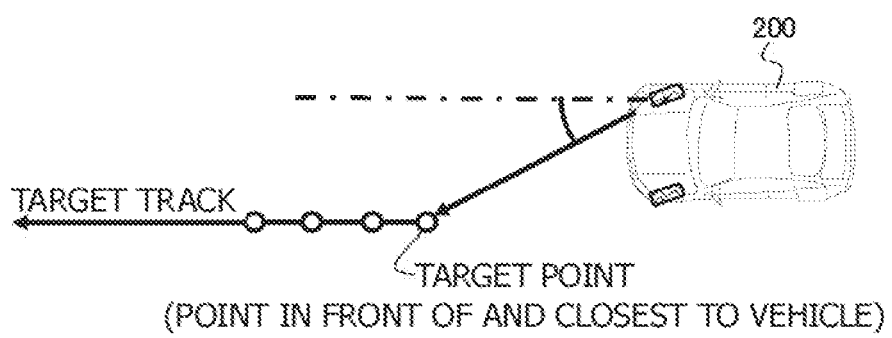
FIG. 3 illustrates a control method for tuning the wheels toward a target point.

FIG. 3 illustrates a target point selected when vehicle 200 runs alone, in other words, when there is no preceding vehicle 800 running in front of vehicle 200 or when preceding vehicle 800 is running separated from vehicle 200 by a predetermined distance or more.

In this case, among the plurality of target points forming the target track, track following control unit 520 selects the target point in front of, and closest to, vehicle 200 as the target point toward which front wheels 210L and 210R are turned.

Next, as in the case in which track following control unit 520 uses rear edge center part 810 of preceding vehicle 800 as the target point, track following control unit 520 calculates steering angle command θcmd2 such that the wheels (specifically, front wheels 210L and 210R) are turned toward the target point closest to vehicle 200.

Upon acquiring steering angle command θcmd2 from track following control unit 520, actuator control unit 530 transmits steering angle command θcmd2 to steering control unit 602 in electronically controlled power steering device 600.

The following description will be made on switching processing between the first control method for converting a lateral acceleration command for causing vehicle 200 to follow a target track into a steering angle control command and the second control method for acquiring, as steering angle control command, a steering angle at which the wheels are turned toward a target point. That is, the processing of control switching unit 522 will be described in detail.

When vehicle 200 is started or stopped and when a target track is far away or does not exist, control switching unit 522 selects the second control method for acquiring, as the steering angle control command, a steering angle at which the wheels are turned toward a target point until vehicle 200 begins to run on a target track. Vehicle control device 500 outputs steering angle command θcmd2 (in other words, the second steering angle control command) as the steering angle control command.

In contrast, when the selection conditions for the second control method are not met, control switching unit 522 selects the first control method for converting the lateral acceleration command for causing vehicle 200 to follow a target track into the steering angle control command. Vehicle control device 500 outputs steering angle command θcmd as the steering angle control command.

When vehicle 200 is started or stopped, the physical amount relating to velocity V of vehicle 200 is equal to, or less than, a predetermined threshold.

In addition, when a target track is far away or does not exist, until vehicle 200 beings to run on a target track the physical amount (specifically, lateral deviation Yerr or angular deviation θerr) relating to the difference in lateral direction or the difference in turning direction is greater than a predetermined value or is not obtained.

That is, the second control method (in other words, steering angle command θcmd2) for turning the wheels toward a target point is selected when there is a high probability that execution of the first control method for converting the lateral acceleration command into the steering angle control command increases steering angle command θcmd and causes overshoot in steering angle control.

In addition, the second control method for turning the wheels toward a target point is selected when steering angle command θcmd2 obtained by the second control method falls below steering angle command θcmd obtained by the first control method for converting the lateral acceleration command into the steering angle control command.

Thus, when vehicle 200 is started or stopped and when a target track is far away or does not exist, track following control unit 520 selects the second control method, not the first control method, to reduce the steering angle control amount and prevent overshoot.

That is, when vehicle 200 is started or stopped and when a target track is far away or does not exist, if track following control unit 520 calculates steering angle command θcmd from lateral acceleration command Ygcmd in accordance with the first control method, the amount of deviation of vehicle 200 from the target track increases. In addition, since velocity V of vehicle 200 is low, steering angle command θcmd increases.

If steering angle command θcmd increases, overshoot in steering angle control may occur. That is, the steering angle may vary, and vehicle 200 may weave or meander.

In contrast, when vehicle 200 is started or stopped and when a target track is far away or does not exist, steering angle command θcmd2 acquired by the second control method is less than steering angle command θcmd calculated from lateral acceleration command Ygcmd by the first control method. That is, the steering angle control based on steering angle command θcmd2 prevents overshoot in steering angle control.

Thus, when vehicle 200 is started or stopped and when a target track is far away or does not exist, that is, when velocity V of vehicle 200 is low and when the amount of deviation from a target track is large, vehicle control device 500 outputs steering angle command θcmd2 acquired by the second control method as the steering angle control command. That is, since overshoot in steering angle control is prevented, the variability of the steering angle due to overshoot, that is, weaving or meandering of vehicle 200, is prevented.

In contrast, when the second control method selection conditions are not met, that is, when velocity V of vehicle 200 is equal to, or less than, predetermined threshold Vth and when the amount of deviation from a target track is greater than the predetermined value, track following control unit 520 selects the first control method for converting the lateral acceleration command for causing vehicle 200 to follow a target track into the steering angle control command. In this way, the following capability of vehicle 200 with respect to the target track is improved.

As described above, when vehicle 200 is in the low velocity traveling state, vehicle control device 500 prevents the variability of the steering angle due to overshoot in steering angle control, that is, weaving or meandering of vehicle 200. In addition, when vehicle 200 is in the intermediate or high velocity traveling state, vehicle control device 500 enables vehicle 200 to follow the target track with high responsivity.

Second Example

Next, a second example will be described. According to the second example, overshoot in steering angle control in the low velocity traveling state is prevented by using a control method different from the second control method for acquiring, as the steering angle control command, a steering angle at which the wheels are turned toward a target point.

According to the second example, based on velocity V, vehicle control device 500 switches the responsivity of the control method for converting the lateral acceleration command into the steering angle control command. Specifically, by decreasing the responsivity in the low velocity traveling state to be lower than the responsivity in the intermediate or high velocity traveling state, vehicle control device 500 prevents the variability of the steering angle due to overshoot in steering angle control, that is, weaving or meandering of vehicle 200, in the low velocity traveling state such as when vehicle 200 is started or stopped.

In other words, track following control unit 520 includes a plurality of control methods, each of which is for converting the lateral acceleration command into the steering angle control command and each of which has a different responsivity. In the low velocity traveling state, control switching unit 522 selects a control method having a responsivity lower than that in the intermediate or high velocity traveling state. In this way, it is possible to prevent the variability of the steering angle due to overshoot in steering angle control, that is, weaving or meandering of vehicle 200, in the low velocity traveling state.

In this control method setting, the second steering angle control command acquired by the poorly responsive second control method of which responsivity is lower than the standard responsivity set for the highly responsive first control method that acquires the first steering angle control command is a steering angle control command having a smaller steering angle control amount with respect to velocity V than that of the first steering angle control command.

Hereinafter, a method for switching the responsivity of the control method for converting the lateral acceleration command into the steering angle control command, in other words, a method for acquiring a steering angle control command for decreasing the responsivity of electronically controlled power steering device 600, will be described in detail.

When model estimation control is performed as the steering angle control for causing vehicle 200 to follow a target track, vehicle control device 500 can switch the responsivity of the steering angle control by switching the estimation time of the model estimation control.

The actuator in electronically controlled power steering device 600 has a response delay, and there is also a response delay, for example, in change in the direction of vehicle 200 with respect to change in the steering angle of front wheels 210L and 210R.

In the second example, by calculating the steering angle control command by performing the model estimation control, vehicle control device 500 can prevent dead time due to the above response delays from deteriorating the following capability of the vehicle 200 with respect to a target track.

Figure 4:
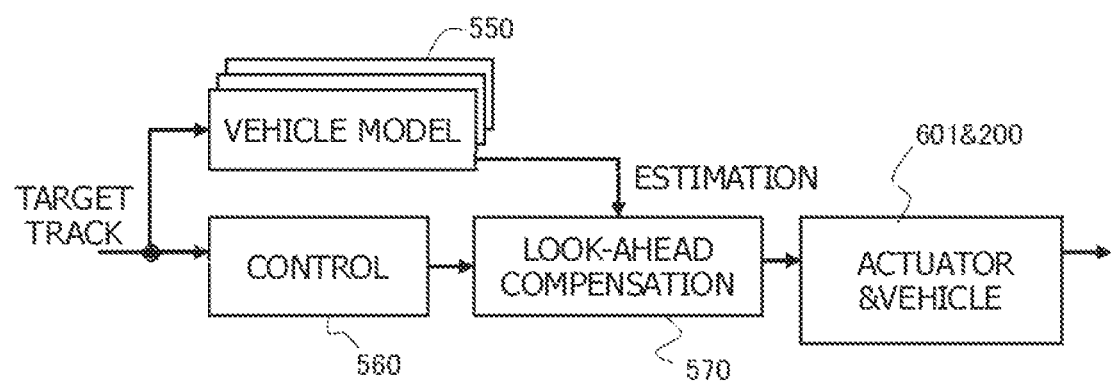
FIG. 4 is a block diagram illustrating model estimation control.

FIG. 4 is a block diagram conceptually illustrating functions of vehicle control device 500 used when vehicle control device 500 calculates a steering angle control command by using the model estimation control.

Vehicle control device 500 includes vehicle models 550 (in other words, estimation models), a control unit 560, and a look-ahead compensation unit 570.

Vehicle control device 500 performs look-ahead compensation by estimating a response after a predetermined estimation time and searching for a steering angle control command that reduces a following error in an estimation period.

In this operation, vehicle control device 500 can reduce the responsivity of the steering angle control by extending the estimation time of the model estimation control.

In the low velocity traveling state in which velocity V of vehicle 200 is equal to, or less than, predetermined threshold Vth (V≤Vth), by setting a longer estimation time for lower velocity V of vehicle 200, vehicle control device 500 decreases the responsivity of the steering angle control. In this way, vehicle control device 500 prevents overshoot in steering angle control in the low velocity traveling state such as when vehicle 200 is started or stopped.

That is, the processing in which vehicle control device 500 changes the estimation time of the model estimation control corresponds to switching of the control method for switching of the responsivity of the steering angle control (in other words, the responsivity of electronically controlled power steering device 600).

When the control method for converting the lateral acceleration command into the steering angle control command is performed, the steering angle control command increases as velocity V decreases. As a result, overshoot in steering angle control easily occurs.

This, when vehicle 200 is in the low velocity traveling state, vehicle control device 500 extends the estimation time as velocity V of vehicle 200 decreases. That is, vehicle control device 500 decreases the responsivity of the steering angle control as velocity V of vehicle 200 decreases. In this way, vehicle control device 500 can prevent the responsivity from decreasing excessively and can prevent overshoot in steering angle control in the low velocity traveling state.

Figure 5:
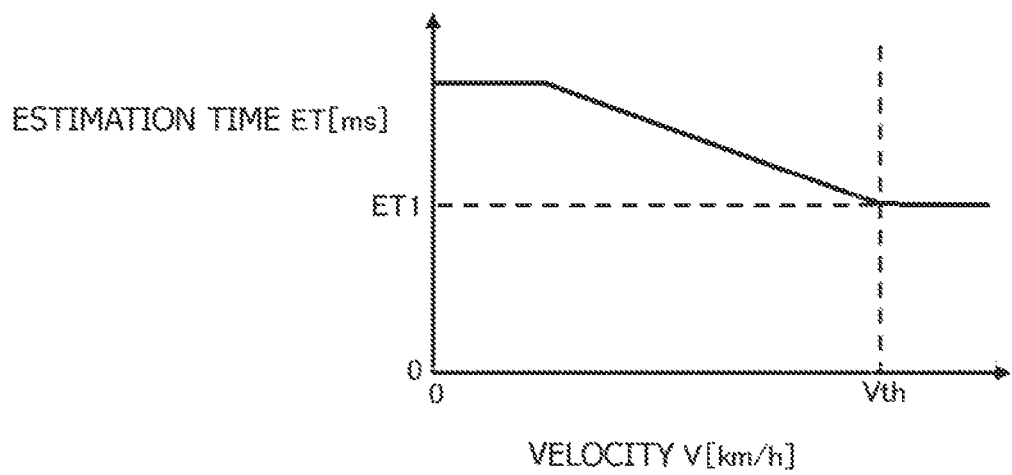
FIG. 5 is a correlation diagram between an estimation time ET and a velocity V.

FIG. 5 is a diagram illustrating a mode of a correlation between estimation time ET and velocity V in the processing for changing the estimation time in the model estimation control based on velocity V of vehicle 200.

Vehicle control device 500 refers to the characteristics illustrated in FIG. 5, in other words, a table or a function for calculating estimation time ET from velocity V of vehicle 200, sets different estimation time ET depending on velocity V, and performs the model estimation control by using set estimation time ET.

In FIG. 5, in the intermediate or high velocity traveling state in which velocity V of vehicle 200 is greater than predetermined threshold Vth (for example, Vth=20 km/h), the estimation time is set to predetermined time ET1, and the model estimation control in which estimation time ET=predetermined time ET1 is performed. That is, the first steering angle control command is acquired by the first control method.

In contrast, in the low velocity traveling state in which velocity V of vehicle 200 is equal to, or less than, predetermined threshold Vth, estimation time ET is set to be longer than predetermined time ET1. Specifically, estimation time ET gradually and progressively increases as velocity V of vehicle 200 progressively decreases from predetermined threshold Vth, and the model estimation control in which estimation time ET>predetermined time ET1 is performed. That is, the second steering angle control command is acquired by the second control method.

In this case, the magnitude of a steering angle control amount with respect to velocity V of vehicle 200, the steering angle control amount being obtained by the steering angle control command calculated when estimation time ET is extended farther from predetermined time ET1, is less than the magnitude of a steering angle control amount with respect to velocity V of vehicle 200, the steering angle control amount being obtained by the steering angle control command calculated when estimation time ET is predetermined time ET1.

Thus, if vehicle control device 500 extends estimation time ET in the model estimation control as velocity V decreases in the low velocity traveling state, the steering angle control amount under each velocity condition is sufficiently reduced, and overshoot in steering angle control is prevented.

Figure 6:
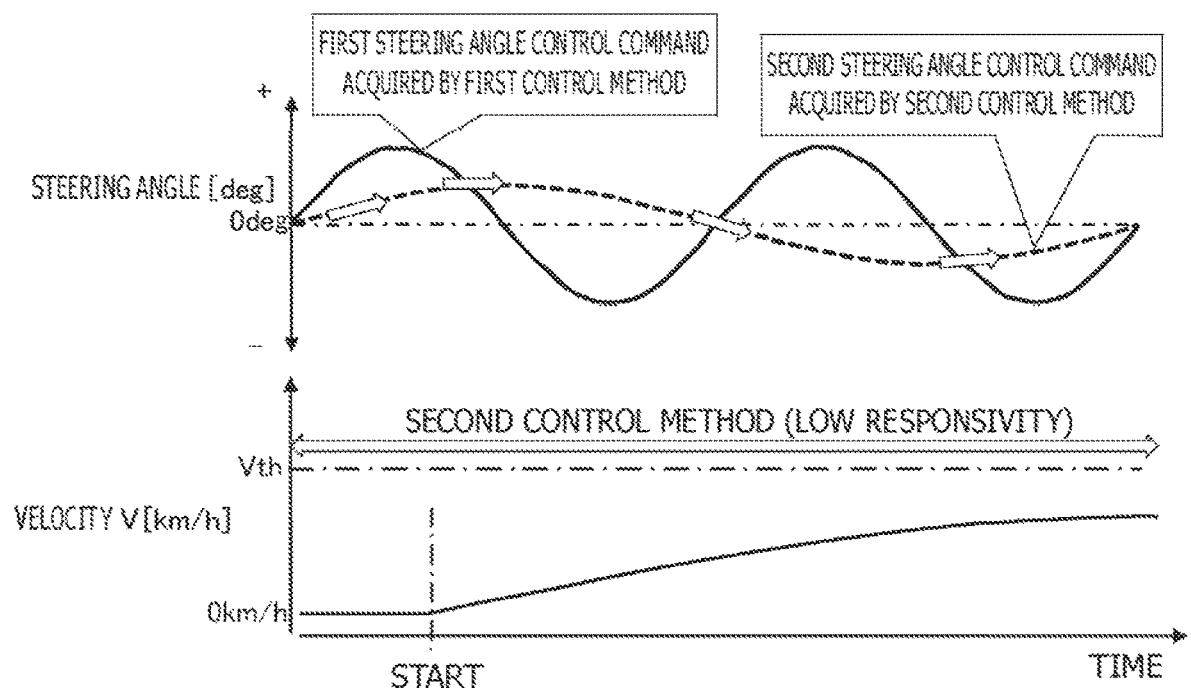
FIG. 6 is a time chart illustrating the difference between variabilities of steering angles of control methods.

FIG. 6 illustrates a steering angle control amount calculated when estimation time ET is set to predetermined time ET1 in the low velocity traveling state (that is, a steering angle control command acquired by the first control method) and a steering angle control amount calculated when estimation time ET is set to be more than predetermined time ET1 (that is, a steering angle control command acquired by the second control method).

The variability width of the steering angle control amount from the deviation from a target track, the variability width being obtained when the responsivity is decreased by setting estimation time ET to be more than predetermined time ET1, is less than the variability width obtained when responsivity is increased by setting estimation time ET to predetermined time ET1.

If vehicle 200 continuously runs in the low velocity traveling state in which velocity V of vehicle 200 is equal to, or less than, predetermined threshold Vth, vehicle control device 500 continuously outputs the steering angle control command calculated by setting estimation time ET to be more than predetermined time ET1 (in other words, the second steering angle control command acquired by the poorly responsive second control method), so as to reduce the variability of the steering angle control amount.

For example, if vehicle 200 maintains the low velocity traveling state after it started, vehicle control device 500 performs the steering angle control by continuously using the poorly responsive control method, in other words, by continuously outputting the steering angle control command calculated by setting estimation time ET to be more than predetermined time ET1.

Figure 7:
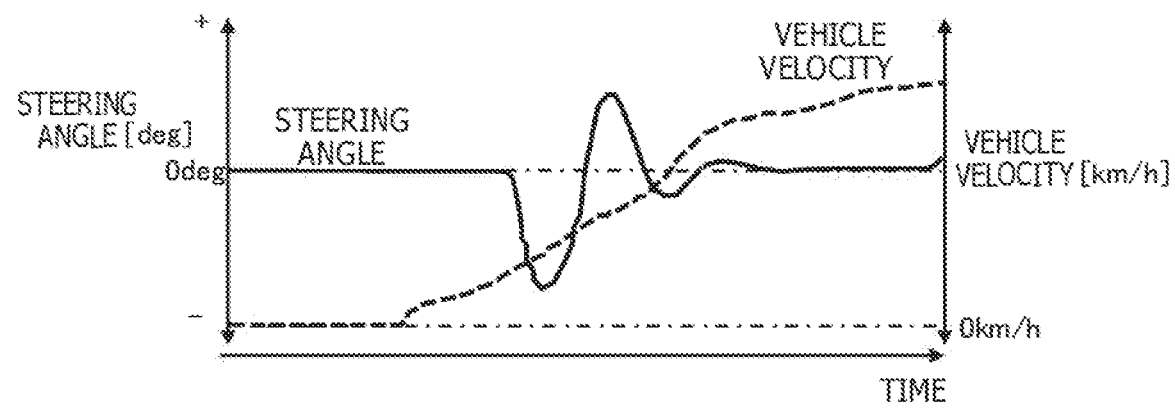
FIG. 7 is a time chart illustrating change in steering angle when the steering angle is controlled with high responsivity.

FIG. 7 is a time chart illustrating change in velocity V and steering angle control amount when vehicle 200 is started. Specifically, FIG. 7 illustrates a case in which the steering angle control command is calculated by the model estimation control without changing estimation time ET based on velocity V, that is, without changing the responsivity based on velocity V. That is, in FIG. 7, same estimation time ET is used, whether the traveling state is the low velocity traveling state or the intermediate or high velocity traveling state.

In this case, because the highly responsive steering angle control is performed in the low velocity traveling state at the start of vehicle 200, the steering angle control amount greatly fluctuates, and overshoot occurs.

Figure 8:
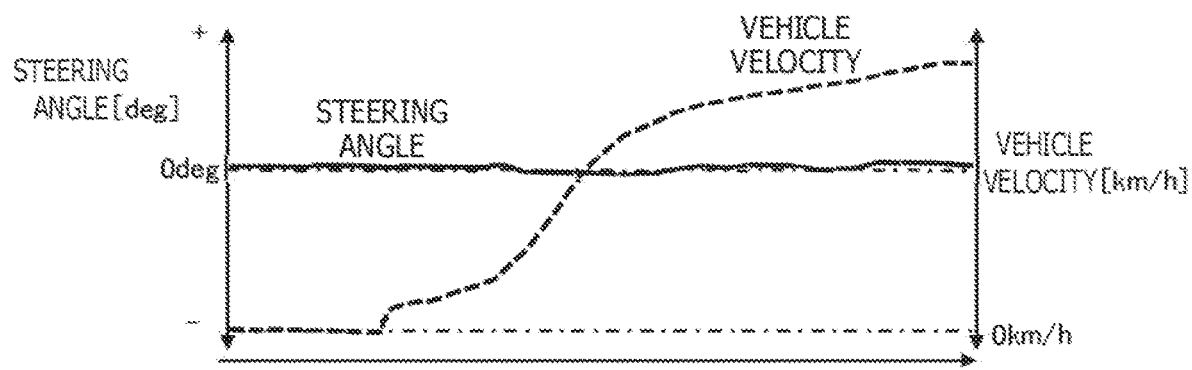
FIG. 8 is a time chart illustrating change in steering angle when the steering angle is controlled with low responsivity.

In contrast, FIG. 8 is also a time chart illustrating change in velocity V and steering angle control amount when vehicle 200 started. However, FIG. 8 illustrates a case in which estimation time ET in the low velocity traveling state is extended to be longer than estimation time ET in the intermediate or high velocity traveling state, so as to decrease the responsivity.

In this case, even when the traveling state is the low velocity traveling state in which the steering angle command increases and overshoot easily occurs, because the responsivity is reduced by extending the estimation time in the model estimation control, overshoot is prevented, and the variability of the steering angle is sufficiently reduced.

Third Example

Hereinafter, another mode of the method for switching the responsivity of the steering angle control based on velocity V will be described as a third example. Specifically, the responsivity is switched by changing the setting of a preview point based on velocity V.

According to the third example, vehicle control device 500 calculates lateral acceleration command Ygcmd based on the amount of deviation of vehicle 200 from a target track at a preview point (specifically, lateral deviation Yerr or angular deviation θerr), converts lateral acceleration command Ygcmd into steering angle command θcmd, and switches the responsivity of the steering angle control by changing the setting of the preview point, that is, the preview distance, based on velocity V.

Preview distance Lp, which determines the preview point, is generally calculated as preview distance Lp=Tp·V based on velocity V of vehicle 200 and preset preview time Tp.

Thus, preview distance Lp increases as velocity V increases, and the preview point is located farther away from its own vehicle as velocity V increases.

In this case, the responsivity of the steering angle control decreases as preview distance Lp increases.

In the calculation of lateral acceleration command Ygcmd based on the amount of deviation at the preview point, for example, it is only necessary to obtain the lateral displacement corresponding to lateral deviation Yerr by causing vehicle 200 to run by preview distance Lp.

Thus, as preview distance Lp increases, lateral acceleration command Ygcmd for the same amount of deviation decreases. As a result, the responsivity of the steering angle control decreases as preview distance Lp increases, and the steering angle control amount with respect to the amount of deviation decreases.

Thus, with general preview distance Lp, which is calculated as preview distance Lp=Tp·V, preview distance Lp decreases as velocity V decreases, and the responsivity of the steering angle control increases.

However, in accordance with the control method for converting lateral acceleration command Ygcmd into steering angle command θcmd, the steering angle control command increases as velocity V decreases, and overshoot may occur.

Thus, unlike the general setting of preview distance Lp, vehicle control device 500 increases preview distance Lp as velocity V decreases in the low velocity traveling state. That is, by decreasing the responsivity of the steering angle control as velocity V decreases, vehicle control device 500 prevents the steering angle control command from increasing, and as a result, overshoot is prevented.

That is, track following control unit 520 in vehicle control device 500 includes, as the control method for converting lateral acceleration command Ygcmd into steering angle command θcmd, the first control method for decreasing preview distance Lp as velocity V decreases (in other words, the first control method using preview distance Lp=Tp·V) and the second control method for increasing preview distance Lp as velocity V decreases.

Control switching unit 522 selects the first control method in the intermediate or high velocity traveling state and selects the second control method in the low velocity traveling state.

In the low velocity traveling state, as the method for increasing preview distance Lp as velocity V decreases, for example, there is a method for changing preview time Tp, which is used for the calculation of preview distance Lp, based on velocity V. There is also a method for assigning preview distance Lp used in the low velocity traveling state per velocity V in advance such that preview distance Lp extends as velocity V decreases.

Figure 9:
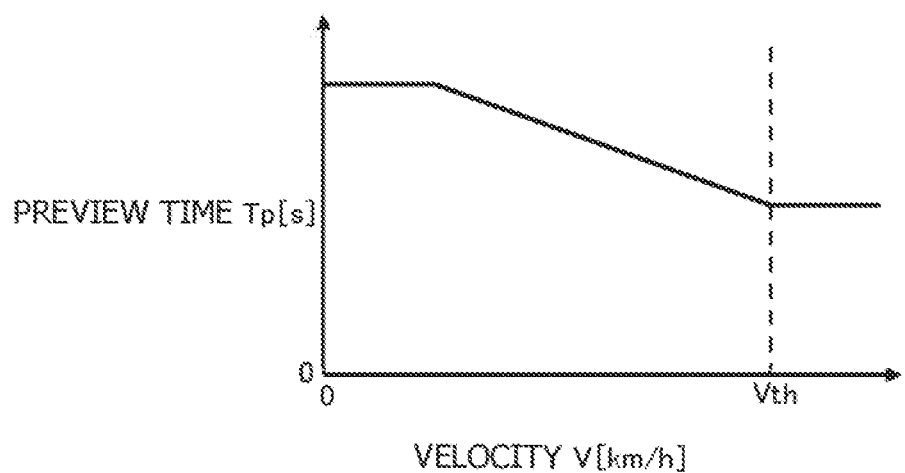
FIG. 9 is a correlation diagram between a preview time Tp and velocity V.

FIG. 9 is a diagram illustrating a mode of a correlation between velocity V of vehicle 200 and preview time Tp when preview time Tp is changed depending on velocity V.

In FIG. 9, in the low velocity traveling state in which velocity V of vehicle 200 is equal to, or less than, predetermined threshold Vth (V≤Vth), vehicle control device 500 increases preview time Tp as velocity V decreases. In contrast, in the intermediate or high velocity traveling state in which velocity V of vehicle 200 exceeds predetermined threshold Vth, vehicle control device 500 maintains preview time Tp corresponding to when velocity V of vehicle 200 is at predetermined threshold Vth.

Track following control unit 520 calculates preview distance Lp (Lp=Tp·V) by using preview time Tp set in accordance with the characteristics illustrated in FIG. 9, in other words, a table or a function for calculating preview time Tp from velocity V of vehicle 200.

Thus, in the low velocity traveling state, by increasing preview time Tp as velocity V decreases, vehicle control device 500 can increase preview distance Lp as velocity V decreases.

In addition, by calculating the amount of deviation from a target track at a preview point set based on preview distance Lp, vehicle control device 500 decreases the responsivity of the steering angle control as velocity V decreases.

In this way, in the low velocity traveling state such as when vehicle 200 is started, vehicle control device 500 maintains a sufficiently small steering angle and prevents variability of the steering angle due to overshoot, that is, weaving or meandering of vehicle 200.

Figure 10:
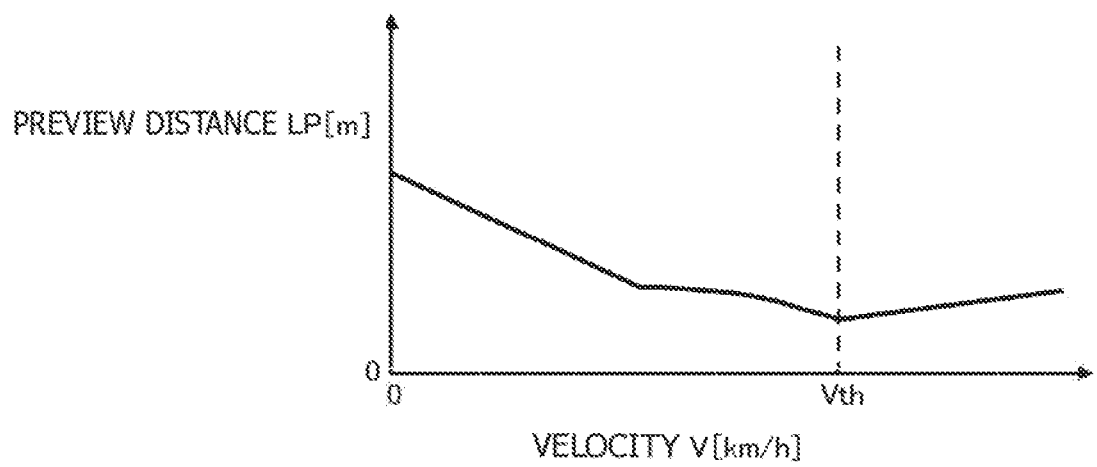
FIG. 10 is a con-elation diagram between a preview distance Lp and velocity V.

FIG. 10 is a diagram illustrating a mode of a correlation between velocity V of vehicle 200 and preview distance Lp when preview distance Lp used in the low velocity traveling state is assigned in advance for each velocity V.

In the low velocity traveling state in which velocity V of vehicle 200 is equal to, or less than, predetermined threshold Vth (V s Vth), vehicle control device 500 increases preview distance Lp as velocity V of vehicle 200 decreases.

That is, when vehicle 200 is in the low velocity traveling state, instead of preview distance Lp set as Lp=Tp·V, vehicle control device 500 adopts preview distance Lp set in accordance with the characteristics illustrated in FIG. 10, in other words, a table or a function for calculating preview distance Lp from velocity V of vehicle 200.

In addition, by determining preview distance Lp as described above, vehicle control device 500 decreases the responsivity of the steering angle control as velocity V decreases. In this way, in the low velocity traveling state such as when vehicle 200 is started, vehicle control device 500 maintains the steering angle to be sufficiently small, and prevents the variability of the steering angle due to overshoot, that is, weaving or meandering of vehicle 200.

Fourth Example

Hereinafter, another mode of the method for switching the responsivity of the steering angle control based on velocity V will be described as a fourth example. Specifically, by changing the characteristics of compensators used for calculation of lateral acceleration command Ygcmd based on lateral deviation Yerr or angular deviation θerr, in other words, the responsivity to lateral deviation Yerr or angular deviation θerr, based on velocity V, the responsivity of the steering angle control is switched.

According to the fourth example, vehicle control device 500 includes a plurality of control methods, each of which uses different characteristics of compensators used for the calculation of lateral acceleration command Ygcmd. In other words, since each of the plurality of control methods uses different characteristics of compensators, different responsivities to lateral acceleration command Ygcmd (eventually, the steering angle control amount) with respect to lateral deviation Yerr or the like are obtained. Vehicle control device 500 selects one of the control methods based on velocity V of vehicle 200.

Figure 11:
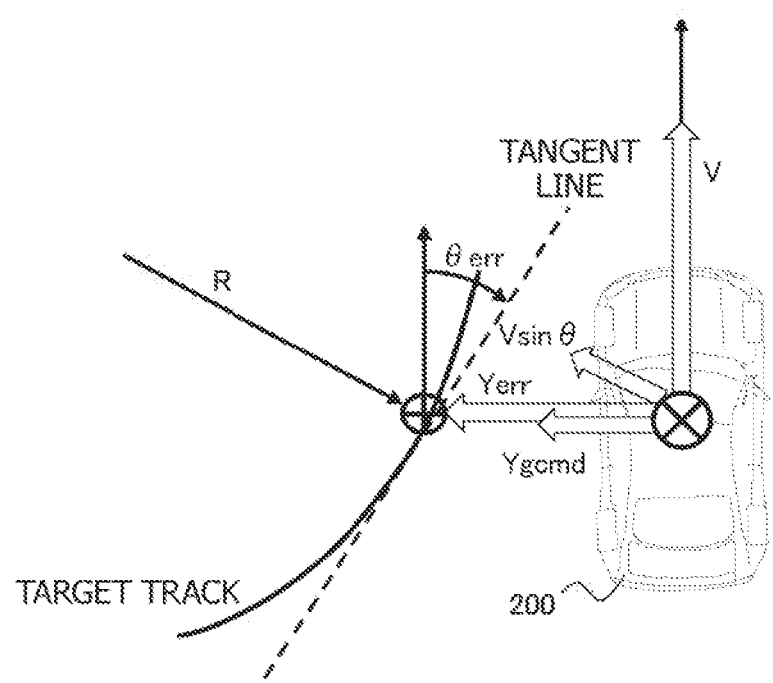
FIG. 11 illustrates parameters used for calculating a lateral acceleration command.

FIG. 11 illustrates a mode of variables used by vehicle control device 500 to calculate lateral acceleration command Ygcmd.

In FIG. 11, the x axis represents the longitudinal direction of vehicle 200, and the y axis represents the lateral direction of vehicle 200. In addition, lateral deviation Yerr represents the distance from a point P which is on a target track located in the y axis direction from the center of the vehicle at a preview point, to the center of the vehicle.

In addition, the angle formed by a tangential direction of the target track at point P and the longitudinal axis (x axis) of vehicle 200 is angular deviation θerr, and the curvature radius of the target track at point P is a curvature radius R (curvature=1/R).

In FIG. 11, vehicle control device 500 calculates lateral acceleration command Ygcmd for reducing lateral deviation Yerr and angular deviation θerr, based on lateral deviation Yerr, angular deviation θerr, curvature radius R, and velocity V for example, in accordance with Equation 3.

$$Ygcmd = G_1 Y_{err} - G_2 V \sin\theta_{err} + G_3 \frac{1}{R} V^2 \quad \text{[Equation 3]}$$

When vehicle 200 is in the low velocity traveling state, vehicle control device 500 reduces individual compensators G1, G2, and G3 in Equation 3 as velocity V decreases. That is, vehicle control device 500 reduces the responsivity by reducing the gain of lateral acceleration command Ygcmd with respect to lateral deviation Yerr, angular deviation θerr, and curvature 1/R as velocity V decreases.

In addition, when calculating lateral acceleration command Ygcmd from the lateral deviation alone without using the angular deviation and the curvature, vehicle control device 500 can also reduce the responsivity by reducing the corresponding compensator G as velocity V decreases.

For example, vehicle control device 500 can set a single preview point and calculate lateral acceleration command Ygcmd in accordance with Equation 4 based on lateral deviation Yerr at this preview point.

In addition, vehicle control device 500 can set two different preview points, each of which is at a different distance from vehicle 200, and calculate lateral acceleration command Ygcmd in accordance with Equation 5 based on lateral deviations Yerr1 and Yerr2 at their respective preview points.

$$Ygcmd = G Y_{err} \quad \text{[Equation 4]}$$

$$Ygcmd = G_2 Y_{err2} - G_2 Y_{err1} \quad \text{[Equation 5]}$$

In Equation 5, lateral deviation Yerr1 is the lateral deviation at the preview point closer to vehicle 200, and lateral deviation Yerr2 is the lateral deviation at the preview point farther from vehicle 200.

In the low velocity traveling state, vehicle control device 500 reduces compensator G in Equation 4 or compensators G1 and G2 in Equation 5 as velocity V decreases. That is, vehicle control device 500 can reduce the responsivity by reducing the gain of lateral acceleration command Ygcmd with respect to lateral deviation Yerr or lateral deviations Yerr1 and Yerr2.

As described above, vehicle control device 500 changes the magnitude of the individual compensator used for the calculation of lateral acceleration command Ygcmd based on velocity V. That is, by decreasing the responsivity of the steering angle control as velocity V decreases, vehicle control device 500 maintains the steering angle to be sufficiently small in the low velocity traveling state such as when vehicle 200 is started. As a result, vehicle control device 500 prevents the variability of the steering angle due to overshoot, that is, weaving or meandering of vehicle 200.

Although characteristics of a compensator are changed based on velocity V in the above description, a different technique other than gain compensation may alternatively be performed. For example, when vehicle control device 500 calculates lateral acceleration command Ygcmd by performing phase compensation, the responsivity of the steering angle control amount may be changed by changing characteristics of the phase compensation based on velocity V.

In addition, instead of changing the characteristics of all the compensators used for the calculation of lateral acceleration command Ygcmd based on velocity V, vehicle control device 500 may change the characteristics of at least one of the compensators or may change the characteristics of each compensator differently.

Fifth Example

Next, a mode of the timing of switching of the steering angle control command (in other words, the control method) will be described as a fifth example.

Figure 12:
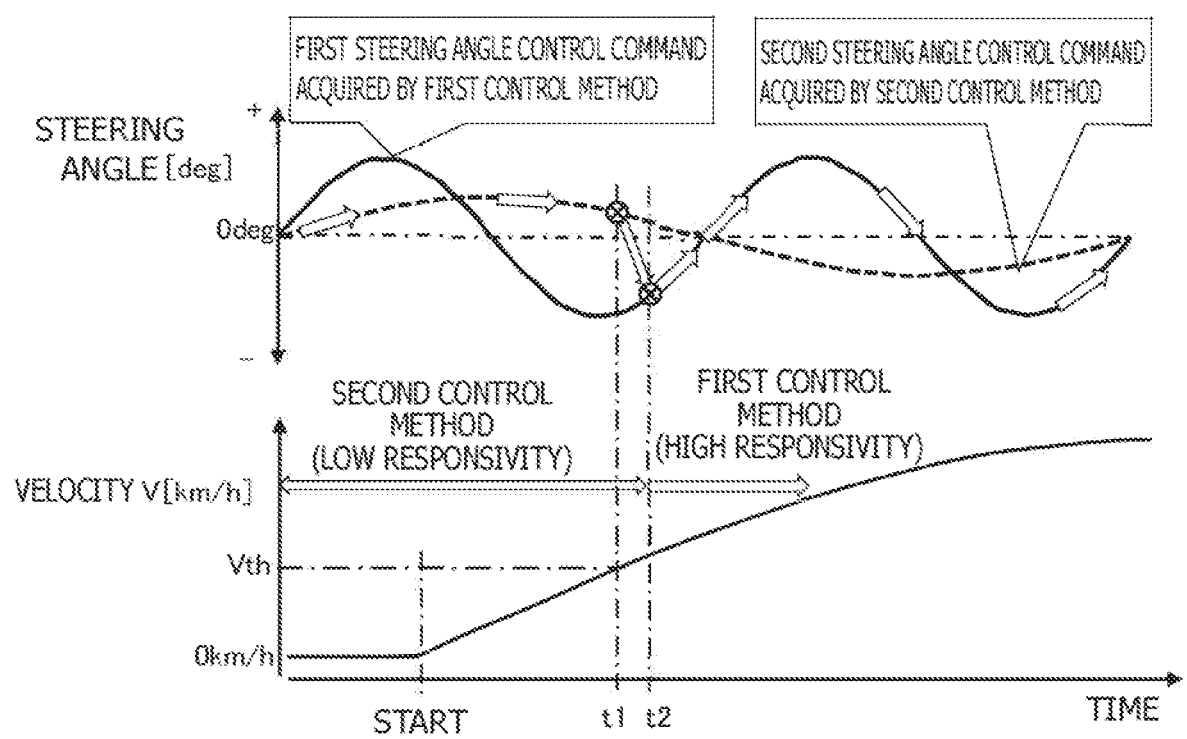
FIG. 12 is a time chart illustrating switching of the control methods based on velocity V.

FIG. 12 is a time chart illustrating the timing of switching from the second control method to the first control method, in other words, switching from the second steering angle control command to the first steering angle control command, when velocity V exceeds predetermined threshold Vth. FIG. 12 also illustrates how the steering angle control command changes as a result of the switching.

In FIG. 12, the second control method is for the low velocity traveling state and has a responsivity lower than that of the first control method, and the first control method is for the intermediate or high velocity traveling state and has a responsivity higher than that of the second control method.

Examples of the poorly responsive second control method include the control method for calculating the steering angle command for turning the wheels to a target point.

In the case of the switching performed by the control method illustrated in FIG. 12, when velocity V exceeds predetermined threshold Vth at time t1 after vehicle 200 is started and accelerated, vehicle control device 500 determines to switch the control method from the poorly responsive second control method to the highly responsive first control method and switches the control method from the poorly responsive second control method to the highly responsive first control method at time t2.

In other words, when the state is switched from the low velocity traveling state to the intermediate or high velocity traveling state, vehicle control device 500 switches the steering angle control command from the second steering angle control command obtained by the second control method to the first steering angle control command obtained by the first control method.

In the intermediate or high velocity traveling state in which the first control method is selected, when velocity V reaches predetermined threshold Vth, vehicle control device 500 can switch the control method from the first control method to the second control method.

As described above, vehicle control device 500 can switch the control method at a timing determined by comparison between velocity V and predetermined threshold Vth. Because the determination for this switching is comparison processing between velocity V and predetermined threshold Vth, the calculation load on vehicle control device 500 is low.

However, when the control method is switched based on comparison between velocity V and predetermined threshold Vth, depending on the switching timing, the difference between the steering angle control amount of the steering angle control command obtained by the current control method and the steering angle control amount of the steering angle control command obtained by the next control method may greatly differ from each other. As a result, the steering angle may rapidly change.

Sixth Example

Hereinafter, a control method switching method that can prevent rapid change in steering angle even when the control method is switched will be described as a sixth example.

According to the sixth example, vehicle control device 500 prevents rapid change in steering angle even when the control method is switched by performing the switching based on not only the condition about velocity V but also the timing at which the magnitude of the steering angle control amount of the first steering angle control command crosses the magnitude of the steering angle control amount of the second steering angle control command.

Specifically, after the switching condition about velocity V is met, vehicle control device 500 does not perform the switching until the magnitude of the steering angle control amount of first steering angle control command crosses the magnitude of the steering angle control amount of the second steering angle control command.

Figure 13:
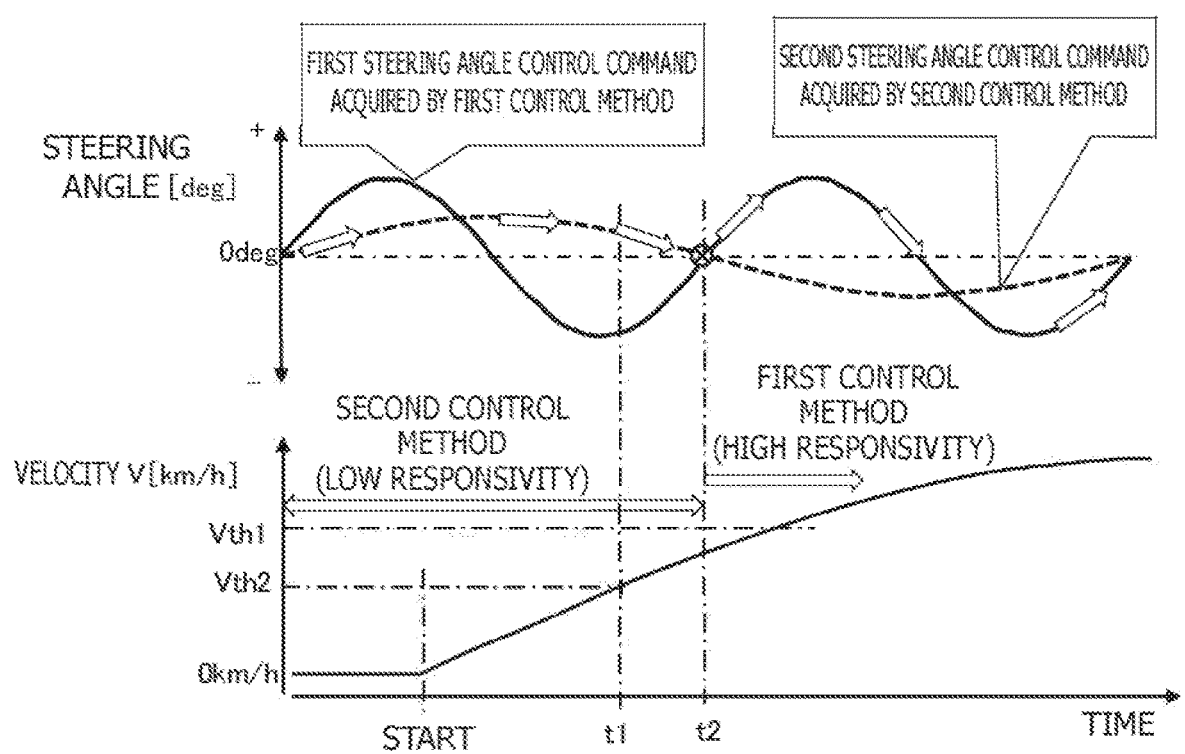
FIG. 13 is a time chart illustrating switching of the control methods based on velocity V and a steering angle control amount.

FIG. 13 is a time chart illustrating switching performed when the magnitudes of the steering angle control amounts cross each other. That is, FIG. 13 illustrates switching from the second control method to the first control method.

Even when velocity V exceeds predetermined threshold Vth2 at t1 and the condition for the switching from the poorly responsive second control method to the highly responsive first control method is met, if the steering angle control amounts of the steering angle control commands obtained by the current and next control methods differ from each other by a predetermined value or more, vehicle control device 500 does not switch the control methods but continues to use the poorly responsive second control method.

Next, at time t2, that is, when the difference between the steering angle control amounts of the steering angle control commands obtained by the current and next control methods falls below the predetermined value, in other words, when vehicle control device 500 determines that the magnitudes of the steering angle control amounts obtained by the two control methods cross each other, vehicle control device 500 switches the control method from the second control method to the first control method. In other words, vehicle control device 500 switches the control command from the second steering angle control command to the first steering angle control command.

As described above, in addition to the condition about velocity V whether or not the magnitudes of the steering angle control amounts obtained by the two control methods cross each other is used as a condition for switching the control method. In this way, because the switching is performed when there is almost no difference between the steering angle control amounts obtained by the two control methods, vehicle control device 500 can prevent the switching of the control methods from rapidly changing the steering angle.

Although FIG. 13 illustrates the switching from the second control method to the first control method, the same applies to the switching from the first control method to the second control method. That is, if vehicle control device 500 determines that the magnitudes of the steering angle control amounts obtained by the two control methods have crossed each other after the condition about velocity V is met, vehicle control device 500 can switch the control method from the first control method to the second control method.

In this case, too, vehicle control device 500 can prevent the switching of the control methods from rapidly changing the steering angle.

If velocity V exceeds predetermined threshold Vth1 without the magnitudes of the steering angle control amounts obtained by the two control methods crossing each other, vehicle control device 500 switches the control method from the second control method to the first control method, in other words, switches the control command from the second steering angle control command to the first steering angle control command.

As described above, even if the magnitudes of the steering angle control amounts obtained by the two control methods do not cross each other, because vehicle control device 500 switches the control methods based on the condition about vehicle velocity V deterioration in following capability with respect to the target track can be prevented.

Seventh Example

In the above example, vehicle control device 500 switches the control mode from the first control method to the second control method as velocity V decreases. According to a seventh example, vehicle control device 500 uses the second control method only when vehicle 200 is started. That is, in other cases, vehicle control device 500 does not switch the control mode from the first control method to the second control method as velocity V decreases.

Hereinafter, this control method switching processing will be described as the seventh example.

According to the seventh example, after vehicle 200 is started, when velocity V of vehicle 200 exceeds predetermined threshold Vth and when vehicle control device 500 switches the steering angle control command from the second steering angle control command to the first steering angle control command (in other words, when vehicle control device 500 switches the control method from the poorly responsive second control method to the highly responsive first control method), vehicle control device 500 continues to output the first steering angle control command (in other words, the selected highly responsive first control method) until vehicle 200 is stopped, even if velocity V becomes equal to, or less than, predetermined threshold Vth.

Vehicle 200 is in the low velocity traveling state either when vehicle 200 is started or when vehicle 200 is stopped. However, while vehicle control device 500 performs the steering angle control by using the second steering angle control command obtained by the poorly responsive second control method when vehicle 200 is started, vehicle control device 500 performs the steering angle control by using the first steering angle control command obtained by the highly responsive first control method when vehicle 200 stopped.

Figure 14:
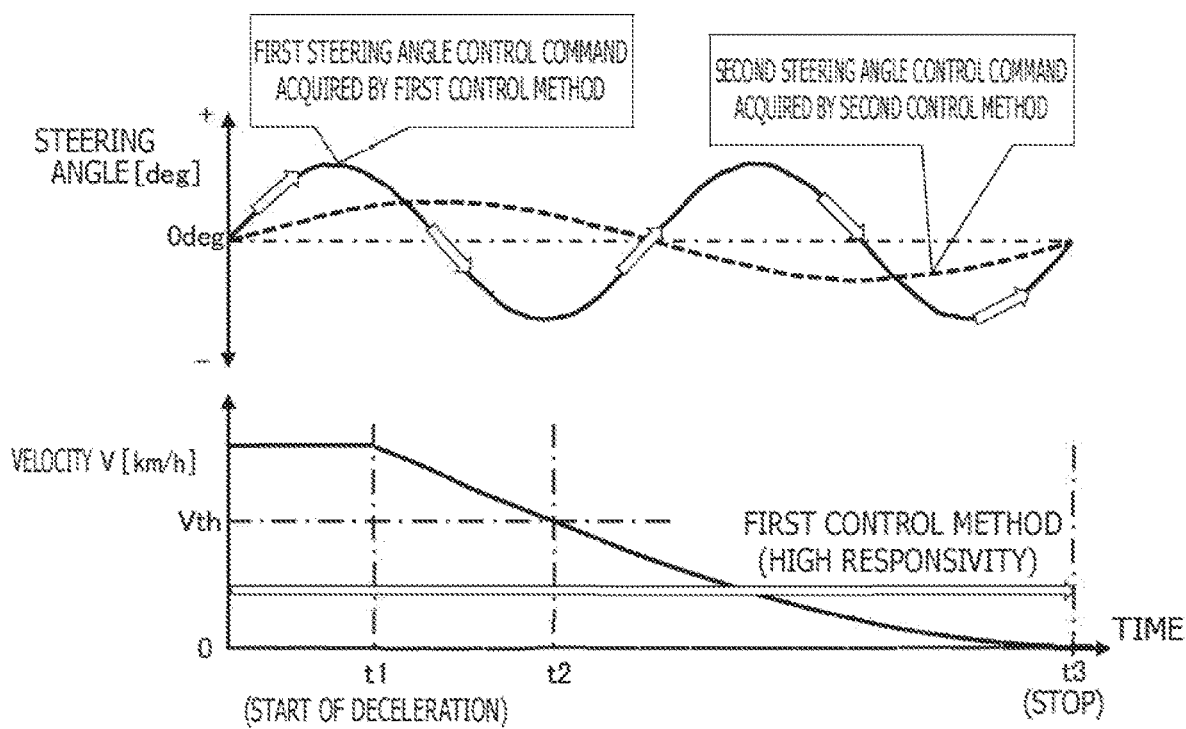
FIG. 14 is a time chart illustrating selection of a control method when the vehicle is stopped.

FIG. 14 is a time chart illustrating selection of the control method (in other words, the steering angle control command) when vehicle 200 is stopped.

In the low velocity traveling state until velocity V exceeds predetermined threshold Vth after the start of vehicle 200, vehicle control device 500 selects the poorly responsive second control method. In this state, when velocity V exceeds predetermined threshold Vth, vehicle control device 500 switches the control method from the poorly responsive second control method to the highly responsive first control method.

FIG. 14 illustrates a state in which vehicle control device 500 has already switched the control method from the poorly responsive second control method to the highly responsive first control method after the start and acceleration of vehicle 200.

In FIG. 14, vehicle 200 starts deceleration at time t1 and stops at time t3, and velocity V crosses predetermined threshold Vth at time t2 during the deceleration.

However, even when velocity V crosses predetermined threshold Vth at time t2 and increases and vehicle 200 reaches the low velocity traveling state, vehicle control device 500 does not use the poorly responsive second control method again, but instead continuously uses the selected highly responsive first control method, in other words, continues to output the first steering angle control command obtained by the first control method. That is, vehicle control device 500 continues to perform the steering angle control in accordance with the highly responsive first control method until vehicle 200 is stopped.

Next, when vehicle 200 is started thereafter, vehicle control device 500 switches the control method from the highly responsive first control method to the poorly responsive second control method and performs the steering angle control in accordance with the poorly responsive second control method until velocity V crosses predetermined threshold Vth and increases after the start of vehicle 200.

According to this control method switching processing, when vehicle 200 is stopped after velocity V crosses predetermined threshold Vth and increases, the steering angle control in accordance with the highly responsive first control method is performed. Thus, the responsivity to the following capability with respect to the target track can be improved when vehicle 200 is stopped, and vehicle 200 can be stopped safely.

In addition, since vehicle control device 500 selects the poorly responsive second control method when vehicle 200 is started thereafter, overshoot in steering angle control is prevented, and the variability of the steering angle is prevented.

The individual technical concepts described in the above examples can be appropriately combined and used as long as there is no conflict.

In addition, although the present invention has thus been described in detail with reference to preferable examples, it is apparent to those skilled in the art that various types of modification are possible, based on the basic technical concepts and teachings of the present invention.

For example, according to the seventh example, when vehicle 200 is stopped after velocity V crosses predetermined threshold Vth and increases, vehicle control device 500 maintains the highly responsive first control method. However, vehicle control device 500 may switch the control method from the highly responsive first control method to the poorly responsive second control method, depending on the decrease rate of velocity V, that is, negative acceleration.

Specifically, in the low velocity traveling state in which the highly responsive first control method is maintained, vehicle control device 500 determines whether the decrease rate of velocity V is less than a threshold, that is, whether the decrease is gradual deceleration, or more than the threshold, that is, whether the decrease is rapid deceleration.

If the decrease of velocity V is gradual deceleration, vehicle control device 500 switches the control method from the highly responsive second control method to the poorly responsive first control method. If the decrease of velocity V is rapid deceleration, vehicle control device 500 maintains the selected highly responsive second control method.

With this configuration, when vehicle 200 makes a sudden stop, vehicle control device 500 can stop vehicle 200 safely by maintaining its following responsivity to the target track. In addition, when vehicle control device 500 continues to run in the low velocity traveling state after the deceleration, vehicle control device 500 can prevent the variability of the steering angle.

In addition, vehicle control device 500 may vary predetermined threshold Vth that is compared with velocity V for the control method switching determination, depending on the acceleration or negative acceleration of vehicle 200.

Specifically, when vehicle 200 is suddenly started and makes a large acceleration or when vehicle 200 is suddenly stopping and makes a large negative acceleration, vehicle control device 500 may decrease predetermined threshold Vth to be less than threshold Vth used when vehicle 200 makes a small acceleration or negative acceleration.

As described above, by changing predetermined threshold Vth depending on the acceleration or negative acceleration, when vehicle 200 is suddenly started, the control mode can be smoothly switched to the highly responsive first control method. In addition, when vehicle 200 is suddenly stopped, the highly responsive first control method can be maintained.

Thus, it is possible to apply the highly responsive first control method as widely as possible while preventing the variability of the steering angle due to overshoot in steering angle control.

The processing for decreasing predetermined threshold Vth includes setting predetermined threshold Vth to zero.

In addition, when vehicle 200 is in the low velocity traveling state and when a target track is far away or does not exist, vehicle control device 500 selects the control method for turning the wheels toward a target point. Even when vehicle 200 is in the low velocity traveling state, if vehicle 200 is relatively close to a target track, vehicle control device 500 selects the poorly responsive control method for calculating the lateral acceleration command based on the deviations. When vehicle 200 is in the intermediate or high velocity traveling state, vehicle control device 500 selects the highly responsive control method for calculating the lateral acceleration command based on the deviations.

In addition, regarding the control method for calculating the lateral acceleration command based on the deviations, by correcting deviation data used for calculating the lateral acceleration command to be less than a detected deviation value, vehicle control device 500 can set the poorly responsive control method.

REFERENCE SYMBOL LIST 100 vehicle control system
200 vehicle
300 external information recognition unit
400 automated (autonomous) driving control device (travel target acquisition unit)
500 vehicle control device (control unit)
600 electronically controlled power steering device (steering device)
700 vehicle motion detection unit

The invention claimed is:

1. A vehicle control device comprising a control unit that outputs, as a steering angle control command, a result obtained by calculation based on input information to a steering device, wherein the control unit performs a process including:
   acquiring a physical amount relating to a difference in lateral direction or a difference in turning direction between an own vehicle and a travel target of the own vehicle;
   acquiring a physical amount relating to a velocity of the own vehicle;
   performing feedback control to reduce the physical amount relating to the difference in lateral direction or the difference in turning direction, so as to acquire a first steering angle control command for increasing a steering angle control amount as the velocity decreases;

acquiring a second steering angle control command for
decreasing the steering angle control amount with
respect to the velocity, compared with a magnitude of
the steering angle control amount with respect to the
velocity obtained by the first steering angle control
command;

outputting the first steering angle control command when
the physical amount relating to the velocity is greater
than a predetermined threshold; and outputting the second steering angle control command
when the physical amount relating to the velocity is
equal to, or less than, the predetermined threshold.

2. The vehicle control device according to claim 1, wherein the control unit performs switching between the first steering angle control command and the second steering angle control command based on the condition about the physical amount relating to the velocity and timing at which a magnitude of the steering angle control amount of the first steering angle control command and a magnitude of the steering angle control amount of the second steering angle control command cross each other.

3. The vehicle control device according to claim 1, wherein when the physical amount relating to the difference in lateral direction or the difference in turning direction is greater than a predetermined value or is not obtained, the control unit outputs the second steering angle control command.

4. The vehicle control device according to claim 3, wherein the control unit acquires a rear edge center part of a preceding vehicle running in front of the own vehicle as the travel target and acquires the second steering angle control command as a steering angle control command for turning a wheel of the own vehicle to the rear edge center part of the preceding vehicle.

5. The vehicle control device according to claim 3, wherein the control unit acquires a target point in front of and closest to the own vehicle as the travel target and acquires the second steering angle control command as a steering angle control command for turning a wheel of the own vehicle to the closest target point.

6. The vehicle control device according to claim 1, wherein when the physical amount relating to the velocity is equal to, or less than, the predetermined threshold, the control unit acquires the second steering angle control command as a steering angle control command for decreasing the responsivity of the steering device as the physical amount relating to the velocity of the own vehicle decreases.

7. The vehicle control device according to claim 6, wherein the control unit acquires the steering angle control command for decreasing the responsivity of the steering device, by extending an estimation time with respect to a point in front of the own vehicle as the physical amount relating to the velocity of the own vehicle decreases.

8. The vehicle control device according to claim 6, wherein the control unit acquires the steering angle control command for decreasing the responsivity of the steering device, by increasing a preview time with respect to a point in front of the own vehicle as the physical amount relating to the velocity of the own vehicle decreases.

9. The vehicle control device according to claim 6, wherein the control unit acquires the steering angle control command for decreasing the responsivity of the steering device, by increasing a preview distance with respect to a point in front of the own vehicle as the physical amount relating to the velocity of the own vehicle decreases.

10. The vehicle control device according to claim 6, wherein the control unit acquires the steering angle control command for decreasing the responsivity of the steering device, by decreasing responsivity to the physical amount relating to the difference in lateral direction or the difference in turning direction as the physical amount relating to the velocity of the own vehicle decreases.

11. The vehicle control device according to claim 1, wherein the control unit switches to the first steering angle control command when the physical amount relating to the velocity exceeds the predetermined threshold.

12. The vehicle control device according to claim 1, wherein after the own vehicle is started, when the physical amount relating to the velocity of the own vehicle exceeds the predetermined threshold, and when the steering angle control command is switched from the second steering angle control command to the first steering angle control command, the control unit continues to output the first steering angle control command until the own vehicle is stopped, even if the physical amount relating to the velocity becomes equal to, or less than, the predetermined threshold.

13. The vehicle control device according to claim 1, wherein, when a low velocity traveling state in which the physical amount relating to the velocity is equal to, or less than, the predetermined threshold continues, the control unit continues to output the second steering angle control command.

14. A vehicle control method comprising:
acquiring a physical amount relating to a difference in lateral direction or a difference in turning direction between an own vehicle and a travel target of the own vehicle;

acquiring a physical amount relating to a velocity of the own vehicle;

performing feedback control to reduce the physical amount relating to the difference in lateral direction or the difference in turning direction, so as to acquire a first steering angle control command for increasing a steering angle control amount as the velocity decreases;

acquiring a second steering angle control command for decreasing the steering angle control amount with respect to the velocity, compared with a magnitude of the steering angle control amount with respect to the velocity obtained by the first steering angle control command;

outputting the first steering angle control command when the physical amount relating to the velocity is greater than a predetermined threshold; and outputting the second steering angle control command when the physical amount relating to the velocity is equal to, or less than, the predetermined threshold.

15. A vehicle control system comprising:
a travel target acquisition unit that acquires a travel target of an own vehicle;

a control unit that acquires a physical amount relating to a difference in lateral direction or a difference in turning direction between the own vehicle and the travel target, acquires a physical amount relating to a velocity of the own vehicle, performs feedback control to reduce the physical amount relating to the difference in lateral direction or the difference in turning direction, so as to acquire a first steering angle control command for increasing a steering angle control amount as the velocity decreases, acquires a second steering angle control command for decreasing the steering angle control amount with respect to the velocity, compared with a magnitude of the steering angle control amount with respect to the velocity obtained by the first steering angle control command, outputs the first steering control command when the physical amount relating to the velocity is greater than a predetermined threshold, and outputs the second steering angle control command when the physical amount relating to the velocity is equal to, or less than, the predetermined threshold; and
a steering device that acquires the first steering angle control command or the second steering angle control command that is output from the control unit.

* * * * *